(12) United States Patent
Ota

(10) Patent No.: US 11,353,849 B2
(45) Date of Patent: Jun. 7, 2022

(54) NUMERICAL CONTROL SYSTEM OF INDUSTRIAL MACHINE

(71) Applicant: FANUC CORPORATION, Yamanashi (JP)

(72) Inventor: Yasuhiro Ota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 16/855,302

(22) Filed: Apr. 22, 2020

(65) Prior Publication Data

US 2020/0341456 A1 Oct. 29, 2020

(30) Foreign Application Priority Data

Apr. 24, 2019 (JP) .............................. JP2019-082966

(51) Int. Cl.
*G05B 19/4155* (2006.01)
*G05B 19/404* (2006.01)

(52) U.S. Cl.
CPC ....... *G05B 19/4155* (2013.01); *G05B 19/404* (2013.01); *G05B 2219/36095* (2013.01)

(58) Field of Classification Search
None
See application file for complete search history.

(56) References Cited

U.S. PATENT DOCUMENTS 4,698,773 A 10/1987 Jeppsson
4,924,403 A 5/1990 Kawamura et al.

5,859,516 A * 1/1999 Muller ................. G05B 19/416
318/269

(Continued)

FOREIGN PATENT DOCUMENTS

| JP | S63-047805 A | 2/1988 |
|---|---|---|
| JP | H01-124006 A | 5/1989 |
| JP | H03161244 A | 7/1991 |

(Continued)

OTHER PUBLICATIONS

Translation of JP H11-65633 A (Year: 1999).*

(Continued)

*Primary Examiner* — Ryan A Jarrett
(74) *Attorney, Agent, or Firm* — Studebaker & Brackett PC

(57) ABSTRACT

An object is to provide a numerical control system of an industrial machine which can suitably add overrides for "each program" or "each of the individual steps within the program" and to thereby prevent a decrease in the quality of a machined surface and the occurrence of a defective part caused only by the fact that an operator desires to change overrides. An override function unit includes: an override specification operation unit for specifying an override; an override restriction command program which is incorporated in a program of a numerical controller (CNC) either according to the operation of the override specification operation unit or previously; an override value determination unit which determines an override value based on the override restriction command program; and an automatic operation execution unit for automatically operating the industrial machine based on an override restriction range determined in the override value determination unit.

4 Claims, 13 Drawing Sheets

(56) References Cited

U.S. PATENT DOCUMENTS

2017/0003672 A1  1/2017  Ishikawa
2019/0391556 A1* 12/2019  Kuroki .................. G05B 19/19

FOREIGN PATENT DOCUMENTS

| JP | H08-063218 A | 3/1996 |
| JP | 2001-014014 A | 1/2001 |
| JP | 2017-016301 A | 1/2017 |

OTHER PUBLICATIONS

An Office Action; "Notice of Reasons for Refusal", mailed by the Japanese Patent Office dated Sep. 7, 2021, which corresponds to Japanese Patent Application No. 2019-082966 and is related to U.S. Appl. No. 16/855,302; with English language translation.

* cited by examiner

NUMERICAL CONTROL SYSTEM OF INDUSTRIAL MACHINE

This application is based on and claims the benefit of priority from Japanese Patent Application No. 2019-082966, filed on 24 Apr. 2019, the content of which is incorporated herein by reference.

BACKGROUND OF THE INVENTION

Field of the Invention

The present invention relates to a numerical control system of an industrial machine.

Related Art

As is known, in the field of machine work, CNC (Computerized Numerical Control) technology is applied, the amount of movement of a tool, the speed of the movement and the like are numerically controlled with a computer and thus the repetition of the same machining procedure, the machining of a complicated shape and the like are highly automated.

On the other hand, in a control system using CNC, an override function is provided in which machining conditions are adjusted without a machining program being edited so as to perform optimum machining, or in which in order for a machining time to be reduced, an operation is controlled by overriding (by applying a multiplication factor: an override amount to) a feedrate or a spindle speed.

In general, in an override function, an override is specified with a dial or the like on an operation panel, a signal corresponding to the specification of the override is reported from a PLC (Programmable Logic Controller), a PMC (Programmable Machine Controller: registered trademark) or the like to a CNC, a feedrate or a spindle speed is overridden and thus an operation is controlled (see FIG. 13).

For example, Patent Document 1 discloses that "an NC cutting device which sequentially moves a cutting tool relative to an article to be cut to required positions in multi-axis directions at required speeds based on numerical control data read from an external data reading device into an NC operation device and which thereby cuts the article to be cut into a required shape includes: a cutting start detection means which detects the start of cutting using the cutting tool; and an override operation device which sets an override amount for increasing or decreasing the tool feedrate of the cutting tool so as to output it to the NC operation device, the override operation device sequentially sets, when the cutting start detection means detects the start of cutting using the cutting tool, the override amount to such a value that the tool feedrate is decelerated to a predetermined value and thereafter sequentially sets the override amount to such a value that the tool feedrate is gradually increased, the NC operation device corrects the tool feedrate specified by the numerical control data according to the override amount and in the NC cutting device for relatively moving the cutting tool at the corrected tool feedrate, the override operation device sets, when the override amount is sequentially set to such a value that the tool feedrate is gradually increased, the override amount such that the degree of change of the override amount when the tool feedrate corrected by the override amount reaches a predetermined value on the side of deceleration with respect to the tool feedrate specified by the numerical control data and the degree of change of the override amount after the arrival are larger than the degree of change of the override amount before the arrival".

Patent Document 1: Japanese Unexamined Patent Application, Publication No. H03-161244

SUMMARY OF THE INVENTION

However, in the conventional override function described above, there are cases where when an operator desires to reduce a machining time, an override is excessively increased so as to lower the quality of a machined surface and to thereby cause the occurrence of a defective part.

When the maximum value and the minimum value of an override are set, and a restriction is placed on the override within this fixed (set) range, unsuitable operation control may be performed in a program or a portion of the program. In other words, even when in a certain program, a restriction on an override in a fixed range suitably functions, and thus the quality of a machined surface can be acquired, if the restriction on the override within the same range is used in another program, it is possible that, for example, the override excessively increases so as to cause the occurrence of a defective part. Even when in a constituent portion of a program, a restriction on an override within a fixed range suitably functions, in another constituent portion of the program, the restriction on the override within the fixed range is placed so as to, for example, excessively increase the override, with the result being that a defective part may occur.

Hence, it is impossible to place a restriction on an override in a determined range, and there is a case where an operator is prevented from applying an override, and so a method of allowing an override to be suitably applied while preventing the occurrence of a defective part was strongly desired.

One aspect of the present disclosure is a numerical control system of an industrial machine which includes an override function unit that overrides a drive unit of the industrial machine, and the override function unit includes: an override specification operation unit for specifying an override; an override restriction command program which is incorporated in a program of a numerical controller either according to an operation of the override specification operation unit or previously; an override value determination unit which determines an override value based on the override restriction command program; and an automatic operation execution unit for automatically operating the industrial machine based on an override restriction range determined in the override value determination unit.

According to the one aspect of the present disclosure, it is possible to add the override restriction command program for setting various types of overrides suitable for "each program" or "each of the individual steps within the program" and to thereby restrict changes in the overrides for "each program" or "each of the individual steps within the program", in other words, it is possible to suitably apply overrides for "each program" or "each of the individual steps within the program" and to thereby reliably prevent a decrease in the quality of a machined surface and the occurrence of a defective part caused only by the fact that an operator desires to change overrides.

DETAILED DESCRIPTION OF THE INVENTION

A numerical control system of an industrial machine according to a first embodiment will be described below with reference to FIGS. 1 to 4.

Here, in the present embodiment, a description will be given with the assumption that the industrial machine is a machine tool. However, the industrial machine according to the present invention may be naturally another industrial machine such as a robot, a transport device, a measurement device, a test device, a press machine, a press-fitting device, a printing machine, a die casting machine, an injection molding machine, a food machine, a packaging machine, a welding machine, a washing machine, a coating machine, an assembly device, a mounter, a woodworking machine, a sealing device or a cutting machine.

Figure 1:
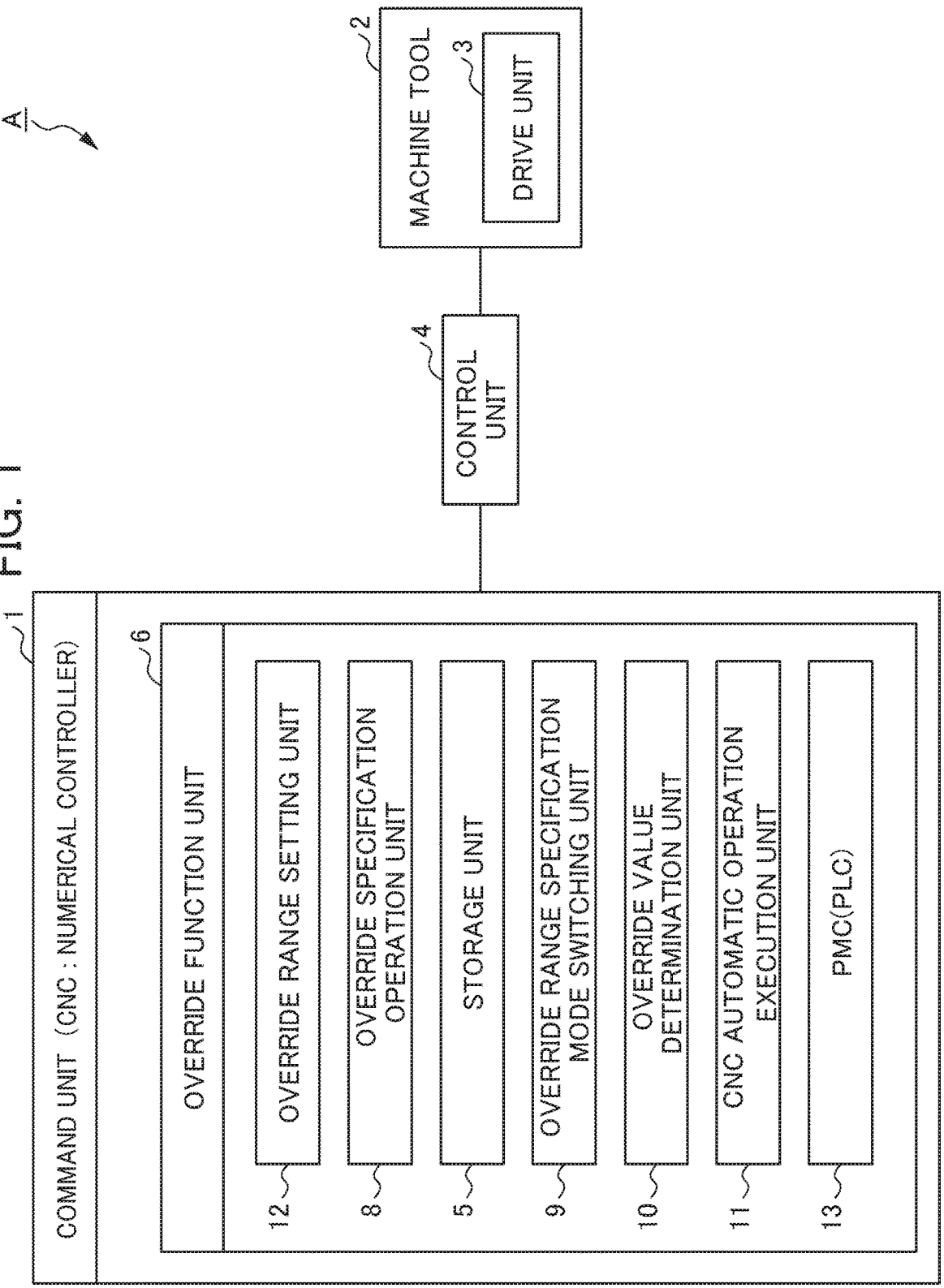
FIG. 1 is a block diagram showing a numerical control system of a machine tool in a first aspect of the present disclosure.

The numerical control system A of the machine tool in the present embodiment includes, as shown in FIG. 1, a CNC 1 of a command unit and a control unit 4 which controls, based on a command of the CNC 1, the drive unit 3 of the machine tool 2.

The drive unit 3 is, for example, a motor such as a servo motor which drives a feed axis of a table or a spindle to which a tool is fitted, and examples of the control unit 4 include a servo amplifier.

The numerical control system A of the machine tool in the present embodiment includes: a storage unit 5 which stores a machining program, a macro program (for example, a p-code macro program or a custom macro program) and the like; and an override function unit 6 which overrides (applies a multiplication factor: an override amount to) a feedrate or a spindle speed in order to control the drive of the drive unit 3 and hence the operation of the machine tool 2. In the present embodiment (FIG. 1), a description will be given with the assumption that the storage unit 5 is a constituent element of the override function unit 6.

Figure 2:
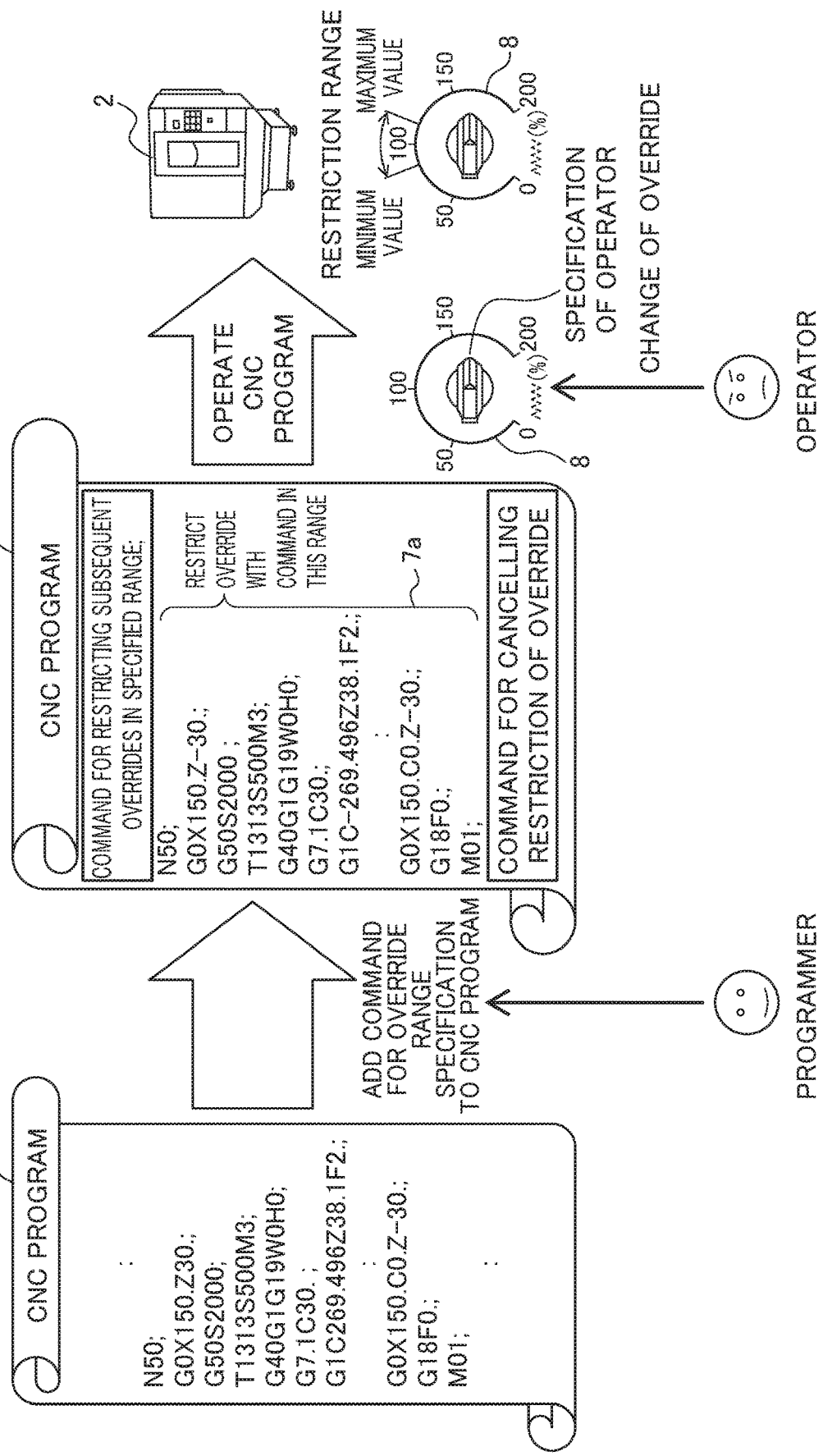
FIG. 2 is a diagram showing the numerical control system of the machine tool in the first aspect of the present disclosure.
Figure 3:
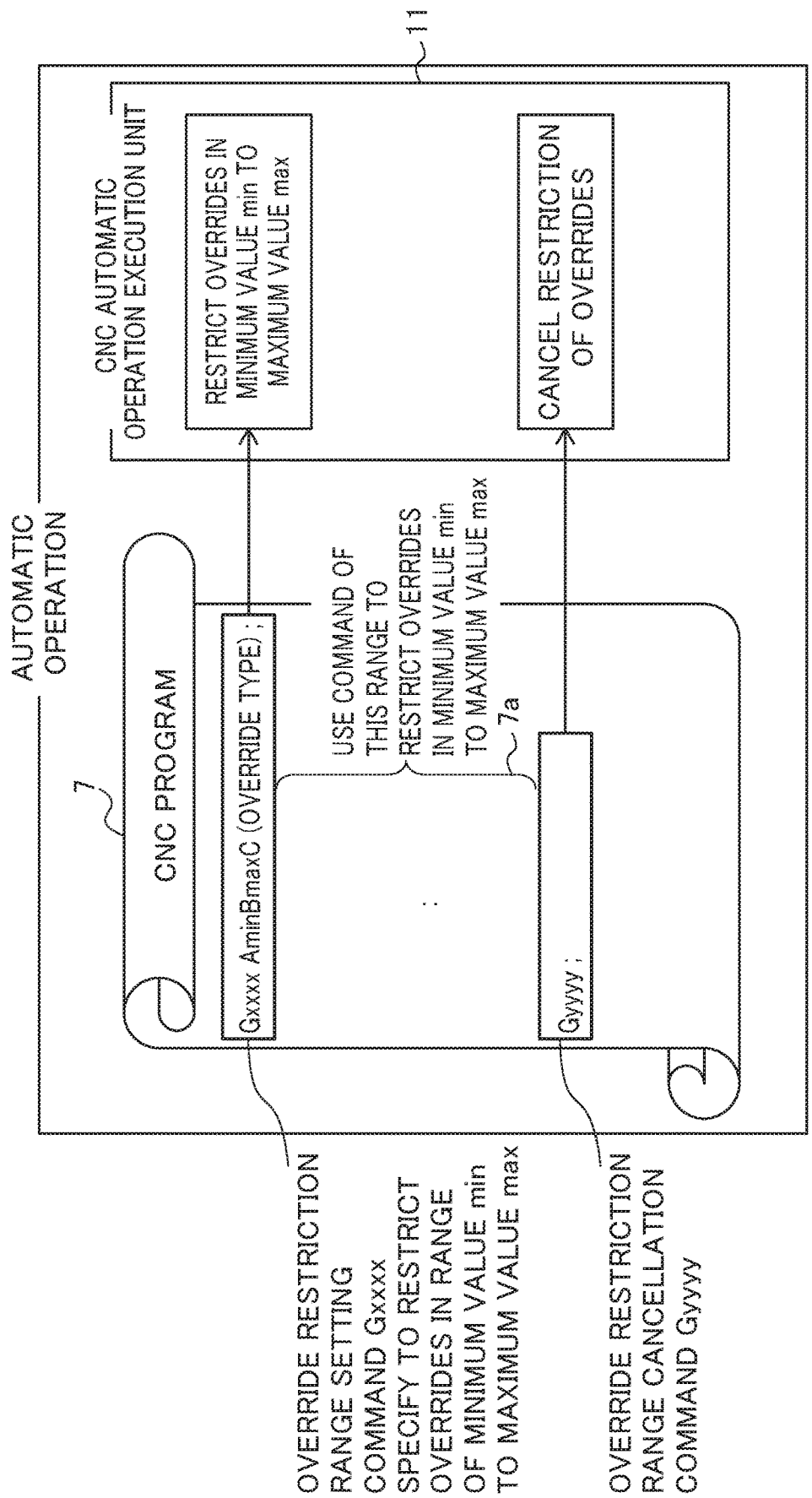
FIG. 3 is a diagram showing the numerical control system of the machine tool in the first aspect of the present disclosure.
Figure 4:
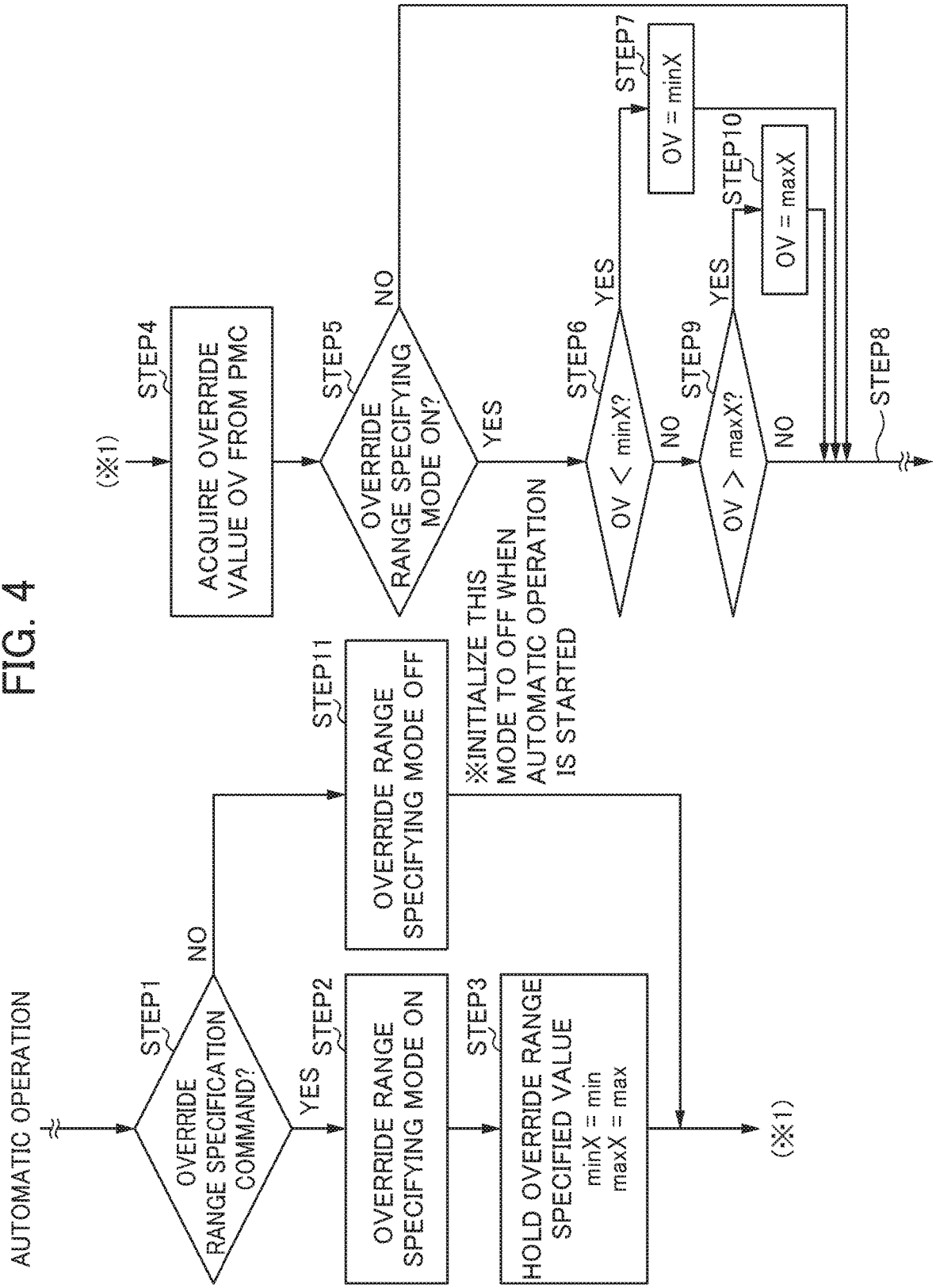
FIG. 4 is a diagram showing a flow for setting an override restriction range with the numerical control system of the machine tool in the first aspect of the present disclosure.

As shown in FIGS. 1 to 3, the override function unit 6 of the present embodiment includes: an override restriction command program 7a which is previously incorporated in the machining program (CNC program) of the CNC 1; an override specification operation unit 8 such as a dial on an operation panel for specifying an override by an operation of an operator or the like; an override range specification mode switching unit 9 which receives a G-code command for an override restriction range setting that is output according to the operation of the override specification operation unit 8 and which switches on a mode for override range specification using the override restriction command program 7a; an override value determination unit 10 which compares an override value that is specified by the operation of the override specification operation unit 8 and an override value that is specified with the override restriction command program 7a so as to determine an override value; and a CNC automatic operation execution unit (automatic operation execution unit) 11 for automatically operating the machine tool 2 based on an override restriction range determined in the override value determination unit 10.

Here, the "G-code command" refers to a command using a G code which provides an instruction for a preparation function for performing machining, and generally refers to a command using a G code which enables a function such as synchronous control where processing is performed only in the CNC 1, mixing control, superposition control, cylindrical interpolation, polar coordinate interpolation, a polar coordinate command, tool diameter compensation, normal direction control, tool tip point control, tool length compensation, scaling, coordinate rotation, three-dimensional coordinate conversion, a programmable mirror or work installation error compensation.

The override restriction command program 7a which is previously incorporated in the machining program 7 of the CNC 1 is a command which receives the G-code command for the override restriction range setting and which restricts overrides in the ranges of the minimum values min to the maximum values max of various types of overrides (such as a feedrate override and a spindle override) suitable for "each CNC program" or "each of the individual steps within the CNC program" and a command (program) which receives a G-code command for override restriction range cancellation and which cancels the restriction of the overrides.

A configuration may be adopted where an override range setting unit 12 is provided which receives the G-code command for the override restriction range setting or in which the override range specification mode switching unit 9 switches on the mode for override range specification and which sets various type of overrides suitable for "each CNC program" or "each of the individual steps within the CNC program" and where by the override range setting unit 12, the command (the override restriction command program 7a) for restricting the overrides in the ranges of the minimum values min to the maximum values max of the overrides suitable for the CNC program 7 is automatically input and added to the CNC program 7 so as to function.

In a case where in the numerical control system A of the machine tool in the present embodiment, the override function unit restricts the override, for example, as shown in FIG.

4 (see FIGS. 1 to 3), when the override specification operation unit 8 such as the dial on the operation panel is operated by the operator or the like, the G-code command for the override restriction range setting (override range specification command (Gxxxx)) is output, and this command is checked (step 1).

When the override range specification command is received, the override range specification mode switching unit 9 switches on an override range specifying mode (step 2), and the override is specified and set such that the override restriction command program 7a restricts the override in the ranges of the minimum values min to the maximum values max (step 3).

Then, an override value OV which is specified with the override specification operation unit 8 by the operator or the like is acquired from a PMC (PLC: in the present embodiment, a description will be given with the assumption that the PLC is the PMC) (step 4), the override value determination unit 10 checks whether or not the override range specifying mode is on (step 5) and furthermore, when the override range specifying mode is on, whether or not OV<minimum value minX is satisfied is checked (step 6).

Then, when OV<minimum value minX is satisfied, the override value determination unit 10 makes a setting such that OV=minimum value minX (step 7), and based on the override restriction range determined in the override value determination unit 10, the CNC automatic operation execution unit 11 starts the automatic operation of the machine tool 2 (step 8).

When OV<minimum value minX is not satisfied, the override value determination unit 10 checks whether or not OV>maximum value maxX is satisfied (step 9), and when OV>maximum value maxX is satisfied, the override value determination unit 10 makes a setting such that OV=maximum value maxX (step 10), and based on this override restriction range determined in the override value determination unit 10, the CNC automatic operation execution unit 11 starts the automatic operation of the machine tool 2 (step 8).

Here, when in the checking of whether or not the override range specification command (Gxxxx) is output in step 1, the override range specification command is not received (such as when a command cancellation operation is performed), the override range specification mode switching unit 9 switches off the override range specifying mode (step 11), and the process proceeds to step 4 in which the override value OV is acquired from the PMC 13.

When whether or not the override range specifying mode is on is checked in step 5, and then the override range specifying mode is off, the automatic operation is started with the override value OV operated and commanded by the operator or the like without being changed (step 8).

Furthermore, when the override range specifying mode is on in step 5, OV<minimum value minX is not satisfied in step 6 and OV>maximum value maxX is not satisfied in step 9, the automatic operation is also started with the override value OV operated and commanded by the operator or the like without being changed (step 8).

Hence, in the override function unit 6 of the numerical control system A of the machine tool (industrial machine) in the present embodiment, the override restriction command program 7a which sets various type of overrides suitable for "each CNC program" or "each of the individual steps within the CNC program" is added to the machining program 7 of the CNC.

In this way, it is possible to restrict changes in the overrides for "each CNC program" or "each of the individual steps within the CNC program", in other words, it is possible to suitably apply overrides for "each CNC program" or "each of the individual steps within the CNC program", with the result that it is possible to reliably prevent a decrease in the quality of a machined surface and the occurrence of a defective part caused only by the fact that the operator desires to change overrides.

In the override function unit 6 of the numerical control system A of the machine tool (industrial machine) in the present embodiment, by the G-code command (preparation function), a restriction is placed on the ranges of changes of overrides caused by a CNC control command (preparation function), and thus it is possible to perform the processing of the override function only in the CNC 1, with the result that with a simple configuration, it is possible to realize the override function unit 6 which is excellent in operability, functionality and the like.

A numerical control system of an industrial machine according to a second embodiment will then be described with reference to FIGS. 5 to 9. In the present embodiment, the same configurations as in the first embodiment are identified with the same reference numerals, and the detailed description thereof will be omitted (including modifications of the other embodiments).

Here, although in the first embodiment, by the G-code command (preparation function), the restriction is placed on the ranges of changes of overrides caused by the CNC control command (preparation function), in the present embodiment, by an M-code command (auxiliary function), a restriction is placed on the ranges of changes of overrides caused by a CNC control command (auxiliary function). The "M-code command" refers to a command using an M code which provides an instruction for the auxiliary function for performing machining, and in the present embodiment, the "M-code command" refers to a command for calling the macro program.

Figure 5:
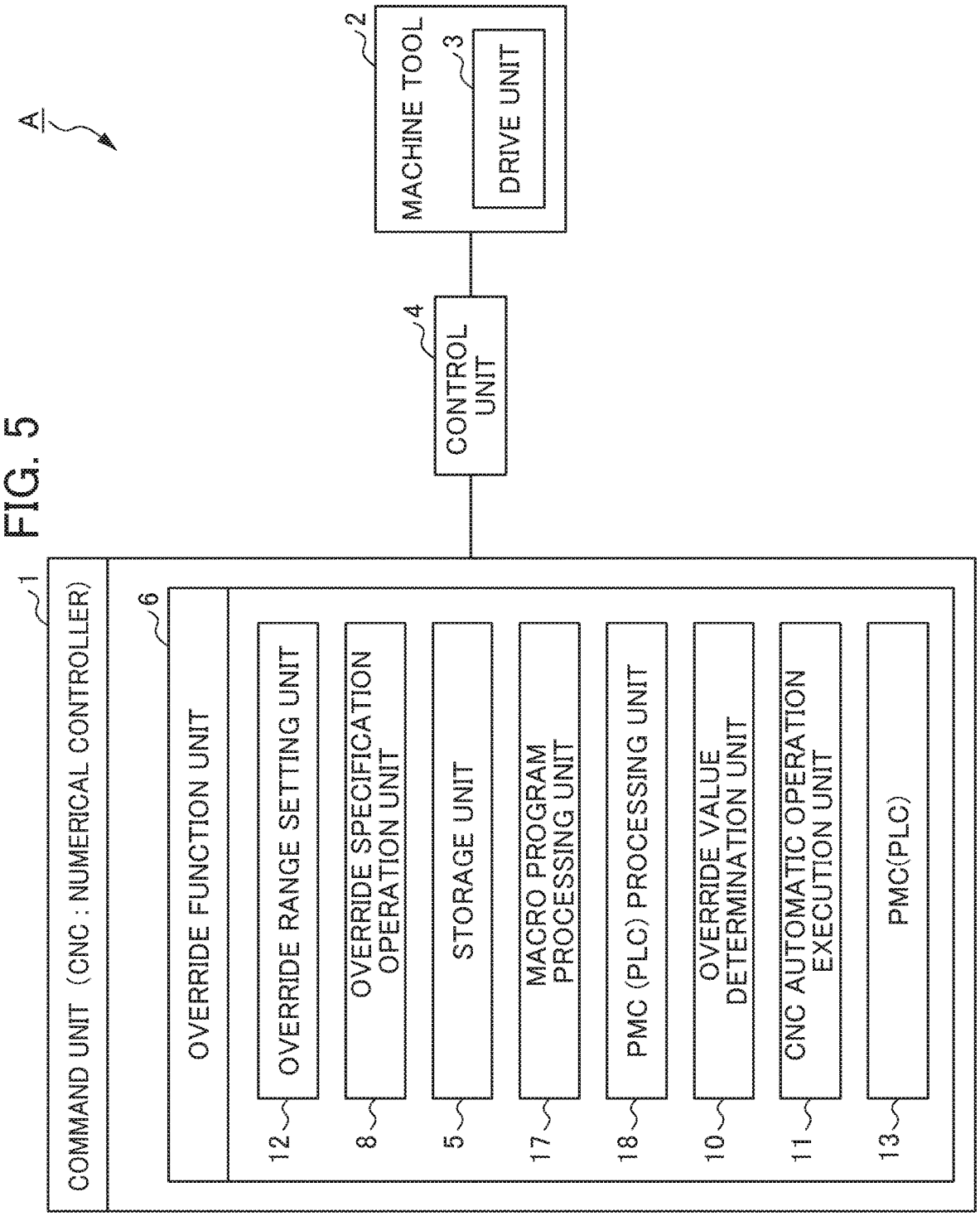
FIG. 5 is a block diagram showing a numerical control system of a machine tool in a second aspect of the present disclosure.

Specifically, the numerical control system A of the machine tool (industrial machine) in the present embodiment includes, as shown in FIG. 5, a CNC (numerical controller) 1 of a command unit, a control unit 4, a storage unit 5 which stores the machining program, the macro program (for example, the p-code macro program or the custom macro program) and the like; and an override function unit 6 which overrides (applies a multiplication factor: an override amount to) a feedrate or a spindle speed in order to control the drive of a drive unit 3 and hence the operation of the machine tool 2.

Figure 6:
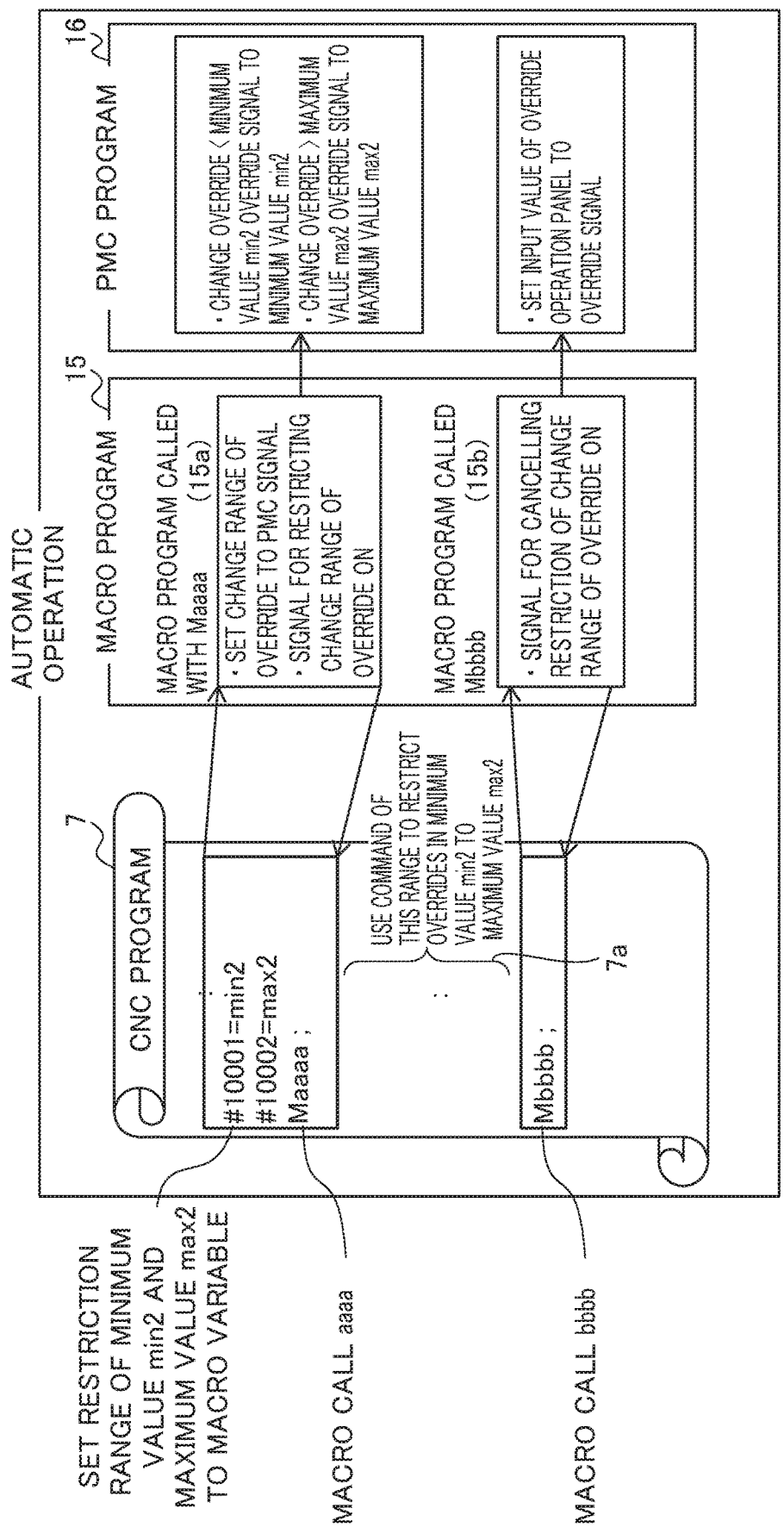
FIG. 6 is a diagram showing the numerical control system of the machine tool in the second aspect of the present disclosure.

As shown in FIGS. 5 and 6, the override function unit 6 of the present embodiment includes: an override restriction command program 7a which is previously incorporated in the machining program (CNC program) 7 of the CNC; an override specification operation unit 8 such as a dial on an operation panel; a macro program processing unit 17 which receives the M-code command for override restriction range setting that is output according to the operation of the override specification operation unit 8, which calls the macro programs 15 (15a, 15b) of the override restriction command program from the storage unit 5 and which feeds, as PMC signals, to a PMC program 16, a restriction signal and a restriction cancellation signal in a range of an override value specified in the override restriction command program 7a; a PMC processing unit 18 which compares a signal of an override value which is specified by the operation of the override specification operation unit 8 and the signal of the override value fed from the macro program processing unit 17 so as to determine an override signal; an override value determination unit 10 which acquires the override value determined in the PMC processing unit 18 so as to determine the override value; and a CNC automatic operation execution unit 11 for automatically operating the machine tool 2 based on the override restriction range determined in the override value determination unit 10.

Here, the override restriction command program 7a which is previously incorporated in the CNC program 7 is a command which receives the M-code command for the override restriction range setting and which calls the macro program 15 that restricts overrides in the ranges of the minimum values min to the maximum values max of various types of overrides (such as a feedrate override and a spindle override) suitable for "each CNC program" or "each of the individual steps within the CNC program" and a command which receives an MG-code command for override restriction range cancellation and which calls the macro program 15 for cancelling the restriction of the overrides.

As in the first embodiment, a configuration may be adopted where an override range setting unit 12 is provided which receives the M-code command for the override restriction range setting and which sets various types of overrides suitable for "each CNC program" or "each of the individual steps within the CNC program" and where by the override range setting unit 12, the command (the override restriction command program 7a) for restricting the overrides in the ranges of the minimum values min to the maximum values max of the overrides suitable for the CNC program 7 is automatically input and added to the CNC program 7 so as to function.

Figure 7:
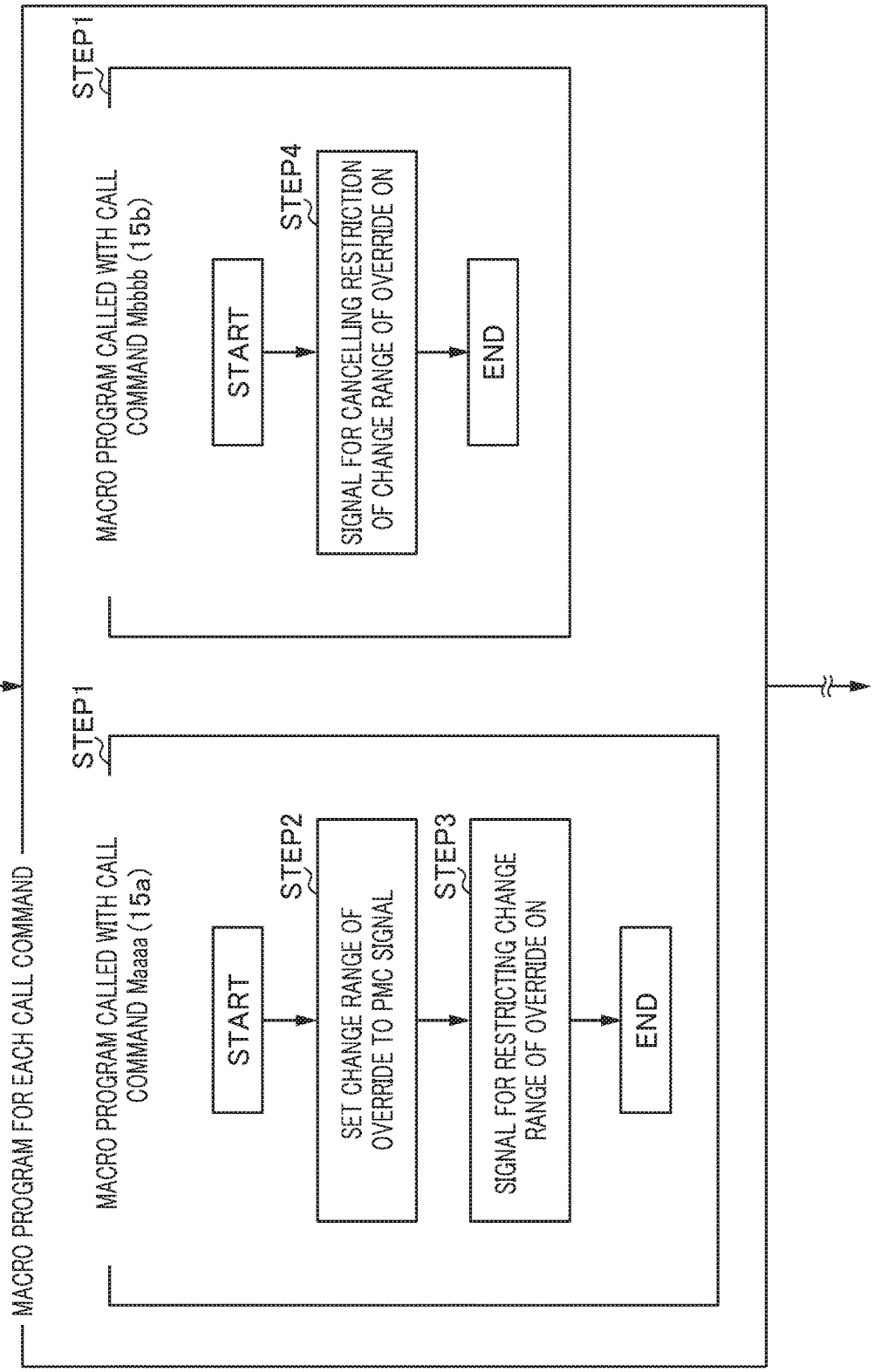
FIG. 7 is a diagram showing a flow for setting an override restriction range with the numerical control system of the machine tool in the second aspect of the present disclosure.

In a case where in the numerical control system A of the machine tool in the present embodiment, the override function unit 6 restricts the override, for example, as shown in FIG. 7 (see FIGS. 5 and 6), when the override specification operation unit 8 such as the dial on the operation panel is operated by the operator or the like, override range specification commands (Maaaa and Mbbbb) of the M-code command for the override restriction range setting are output, and the macro program processing unit 17 which receives these commands calls the macro programs 15 (15a, 15b) from the storage unit 5 (step 1).

The macro program 15a called with the override range specification command (Maaaa) sets the range of a change of the override to the PMC signal (step 2), and switches on a signal for restricting the range of the change of the override (step 3).

The macro program 15b called with the override range specification command (Mbbbb) switches on a signal for cancelling the range of the change of the override (step 4).

Figure 8:
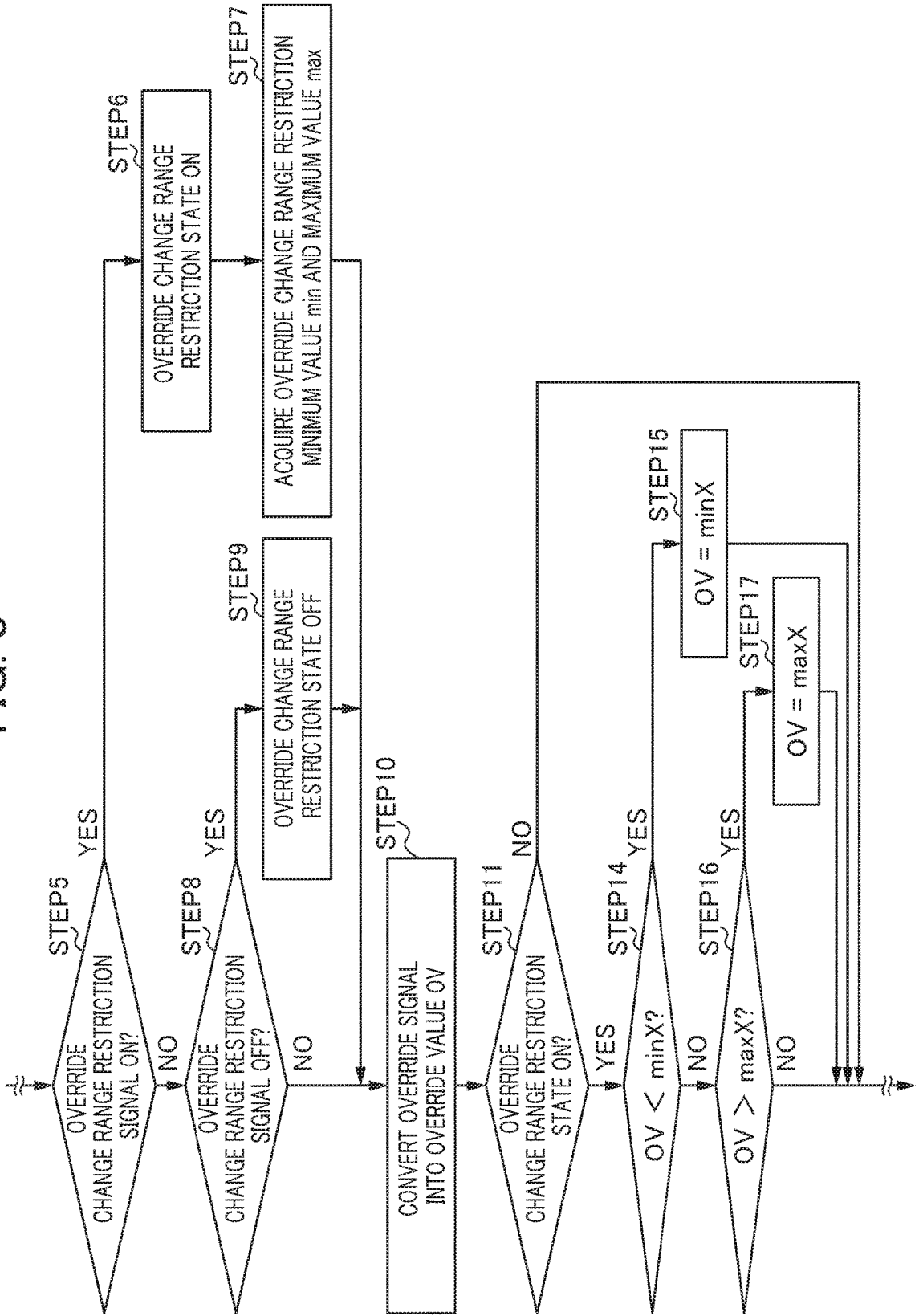
FIG. 8 is a diagram showing a flow for setting the override restriction range with the numerical control system of the machine tool in the second aspect of the present disclosure.

Then, as shown in FIG. 8 (see FIGS. 5, 6 and 7), the PMC processing unit 18 checks whether or not an override change range restriction signal is on (step 5), and when the override change range restriction signal is on, the PMC processing unit 18 switches on an override change range restriction state (step 6) so as to acquire the override change range restriction minimum value min and the override change range restriction maximum value max set in the override restriction command program 7a (step 7).

When the override change range restriction signal is not on, the PMC processing unit 18 checks whether or not the override change range restriction signal is off (step 8), and when the override change range restriction signal is off, the PMC processing unit 18 switches off the override change range restriction state (step 9).

Then, in a case where the override change range restriction signal is not off in step 8, when the override change range restriction minimum value min and the override change range restriction maximum value max are acquired in step 7, through a case where the override change range restriction state is switched off in step 9, the override signal determined in the PMC processing unit 18 is converted into an override value (step 10) and the override value determination unit 10 checks whether or not the override change range restriction state is on (step 11).

Figure 9:
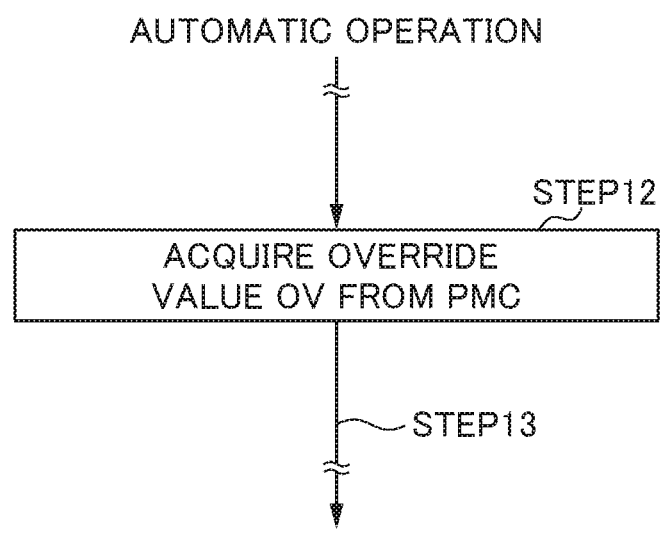
FIG. 9 is a diagram showing a flow for setting the override restriction range in the numerical control system of the machine tool in the second aspect of the present disclosure.

When the override change range restriction state is not on, as shown in FIG. 9, the override value obtained by the conversion in step 10 is acquired without being changed and is adopted in the override restriction command program 7a (step 12), and based on this override restriction range determined in the override value determination unit 10, the CNC automatic operation execution unit 11 starts the automatic operation of the machine tool 2 (step 13).

As shown in FIGS. 8 and 9 (see FIGS. 5, 6 and 7), when the override change range restriction state is on, the override value determination unit 10 checks whether or not OV<minimum value minX is satisfied (step 14).

When OV<minimum value minX is satisfied, the override value is acquired with the assumption that OV=minimum value minX (step 15, step 12), and based on this override restriction range, the CNC automatic operation execution unit 11 starts the automatic operation of the machine tool 2 (step 13).

When OV<minimum value minX is not satisfied, the override value determination unit 10 checks whether or not OV>maximum value maxX is satisfied (step 16), and when OV>maximum value maxX is satisfied, the override value is acquired with the assumption that OV=maximum value maxX (step 17, step 12), and based on this override restriction range, the CNC automatic operation execution unit 11 starts the automatic operation of the machine tool 2 (step 13).

Here, when OV<minimum value minX is not satisfied in step 14, and OV>maximum value maxX is not satisfied in step 16, the override value obtained by the conversion in step 10 is acquired without being changed (step 12), and based on this override restriction range, the CNC automatic operation execution unit 11 starts the automatic operation of the machine tool 2 (step 13).

Hence, in the override function unit 6 of the numerical control system A of the machine tool (industrial machine) in the present embodiment, by the M-code command (auxiliary function), a restriction is placed on the ranges of changes of overrides caused by the CNC control command (auxiliary function), and the override restriction command program 7a which sets various types of overrides suitable for "each CNC program" or "each of the individual steps within the CNC program" is added to the machining program 7 of the CNC.

In this way, as in the first embodiment, it is possible to restrict changes in the overrides for "each CNC program" or "each of the individual steps within the CNC program", in other words, it is possible to suitably apply overrides for "each CNC program" or "each of individual steps within the CNC program", with the result that it is possible to reliably prevent a decrease in the quality of a machined surface and the occurrence of a defective part caused only by the fact that the operator desires to change overrides.

A numerical control system of an industrial machine according to a third embodiment will then be described with reference to FIGS. 10 to 12. In the present embodiment, the same configurations as in the first and second embodiments are identified with the same reference numerals, and the detailed description thereof will be omitted (including modifications of the other embodiments).

Here, although in the first embodiment, by the G-code command (preparation function), the restriction is placed on the ranges of changes of overrides caused by the CNC control command (preparation function), in the present embodiment, an override change range setting is provided in parameters indicated in the CNC program, and by a command for rewriting the parameters, a restriction is placed on the ranges of changes of overrides.

Figure 10:
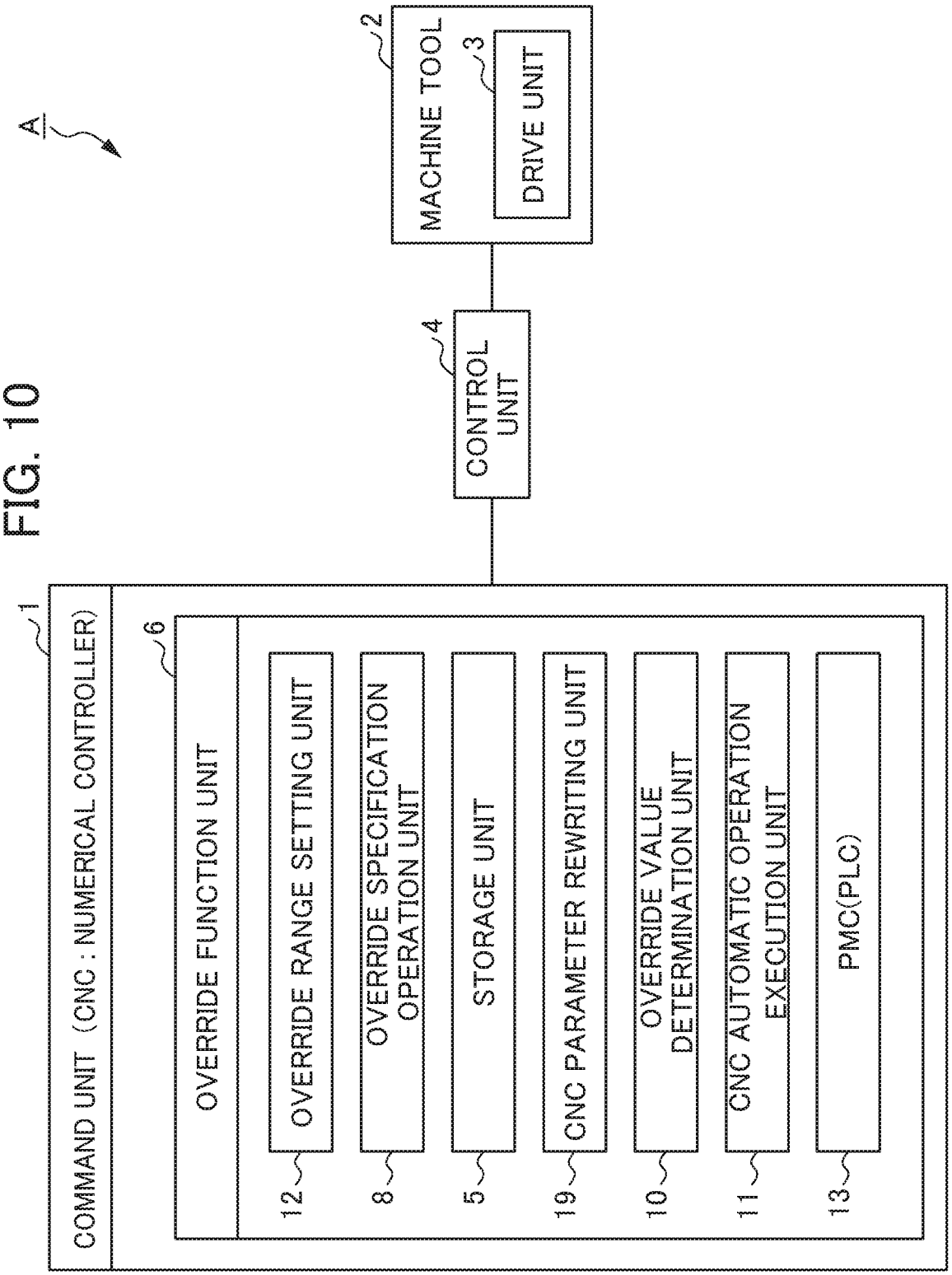
FIG. 10 is a block diagram showing a numerical control system of a machine tool in a third aspect of the present disclosure.

Specifically, the numerical control system A of the industrial machine in the present embodiment includes, as shown in FIG. 10, a CNC (numerical controller) 1 of a command unit, a control unit 4, a storage unit 5 which stores CNC parameters; and an override function unit 6 which overrides (applies a multiplication factor: an override amount to) a feedrate or a spindle speed in order to control the drive of a drive unit 3 and hence the operation of the machine tool 2.

Figure 11:
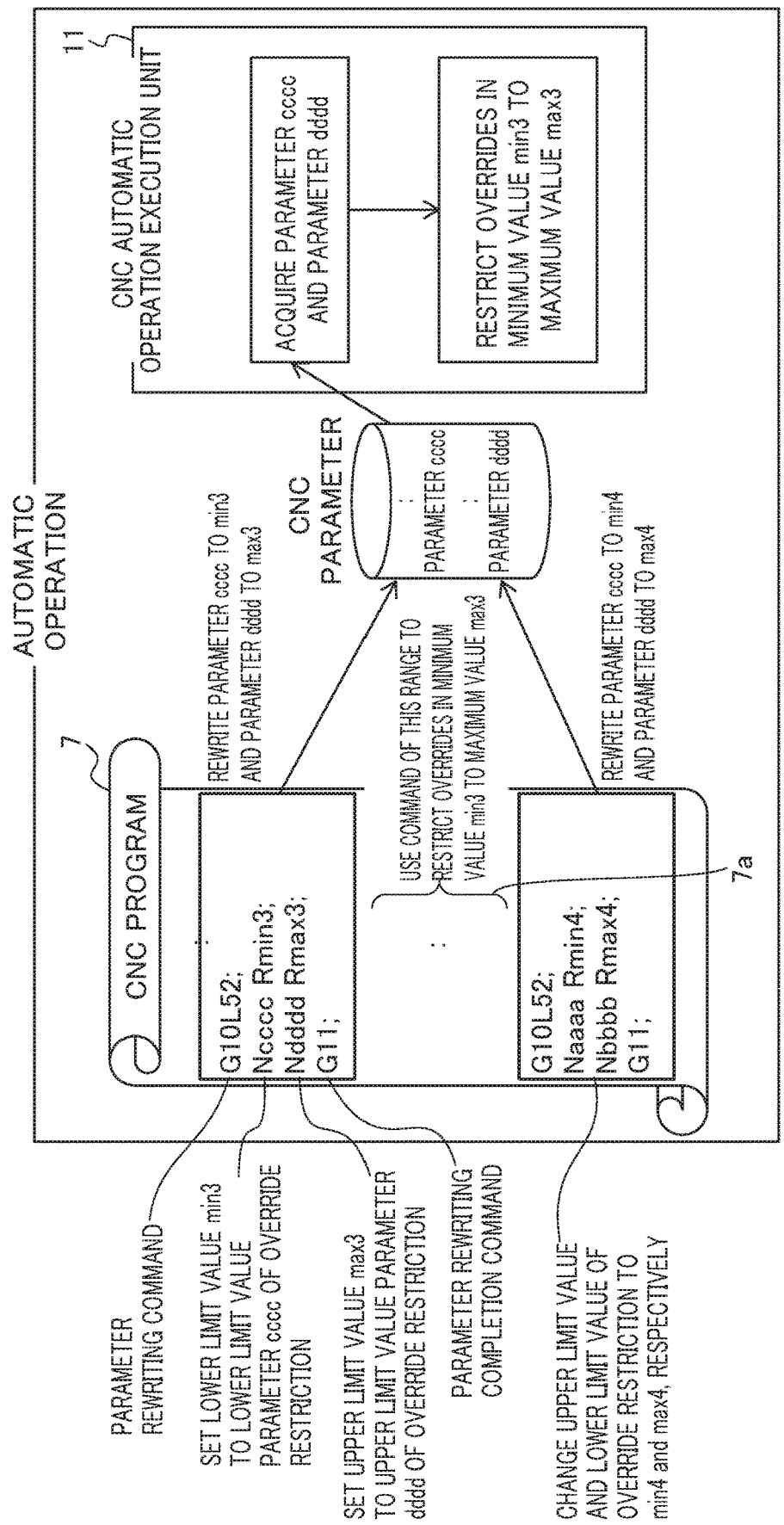
FIG. 11 is a diagram showing the numerical control system of the machine tool in the third aspect of the present disclosure.

As shown in FIGS. 10 and 11, the override function unit 6 of the present embodiment includes: an override restriction command program 7a which is previously incorporated in the machining program (CNC program) 7 of the CNC; an override specification operation unit 8 such as a dial on an operation panel; a CNC parameter rewriting unit 19 which receives a parameter rewriting command for an override restriction range setting that is output according to the operation of the override specification operation unit 8 and which rewrites override change range parameters (cccc and dddd) in the storage unit 5 according to the override restriction command program 7a; an override value determination unit 10 which compares with an override value in an override restriction range set according to the parameters (cccc and dddd) stored in the storage unit 5 so as to determine an override value; and a CNC automatic operation execution unit (automatic operation execution unit) 11 for automatically operating the machine tool 2 based on the override restriction range determined in the override value determination unit 10.

A configuration may be adopted where an override range setting unit 12 is provided which receives the parameter rewriting command for the override restriction range setting and which sets various types of overrides suitable for "each CNC program" or "each of the individual steps within the CNC program" and where by the override range setting unit 12, the command (the override restriction command program 7a) for restricting the overrides in the ranges of the minimum values min to the maximum values max of the overrides suitable for the CNC program 7 is automatically input and added to the CNC program 7 so as to function.

Figure 12:
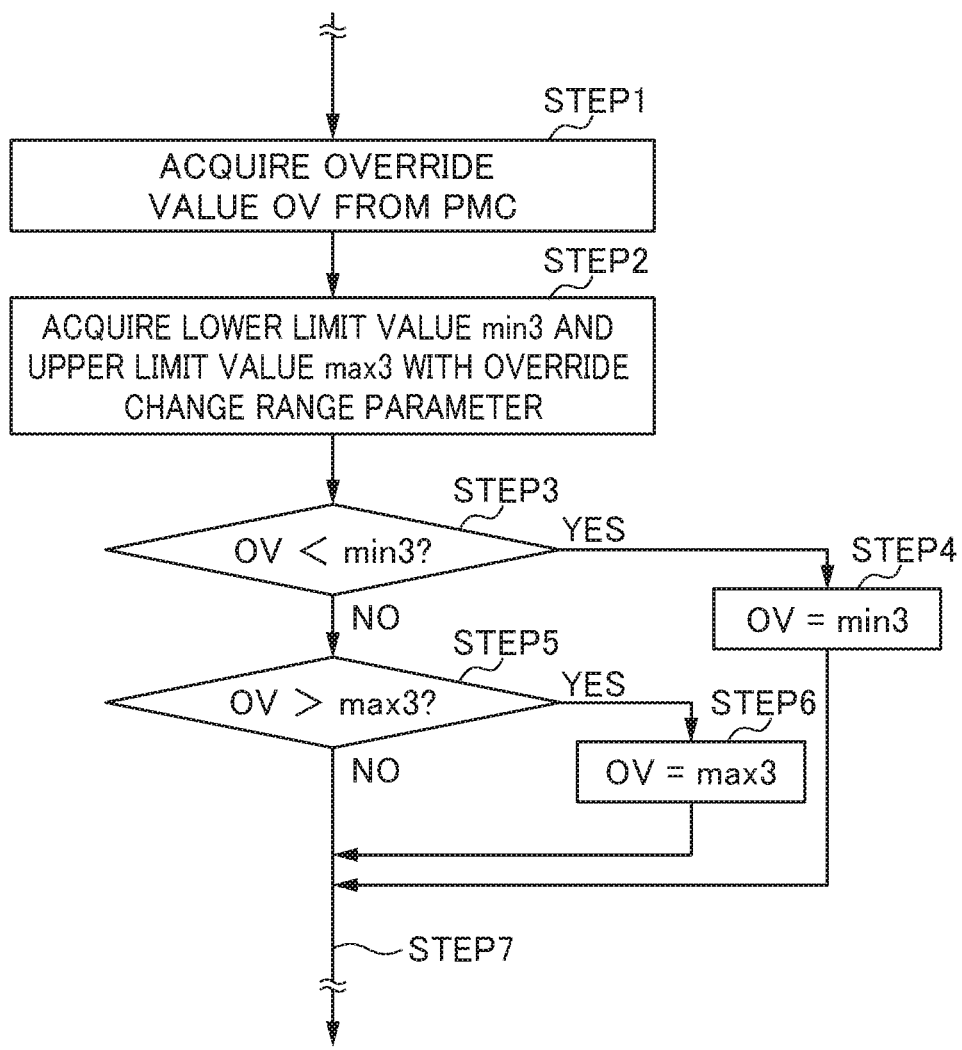
FIG. 12 is a diagram showing a flow for setting an override restriction range in the numerical control system of the machine tool in the third aspect of the present disclosure.
Figure 13:
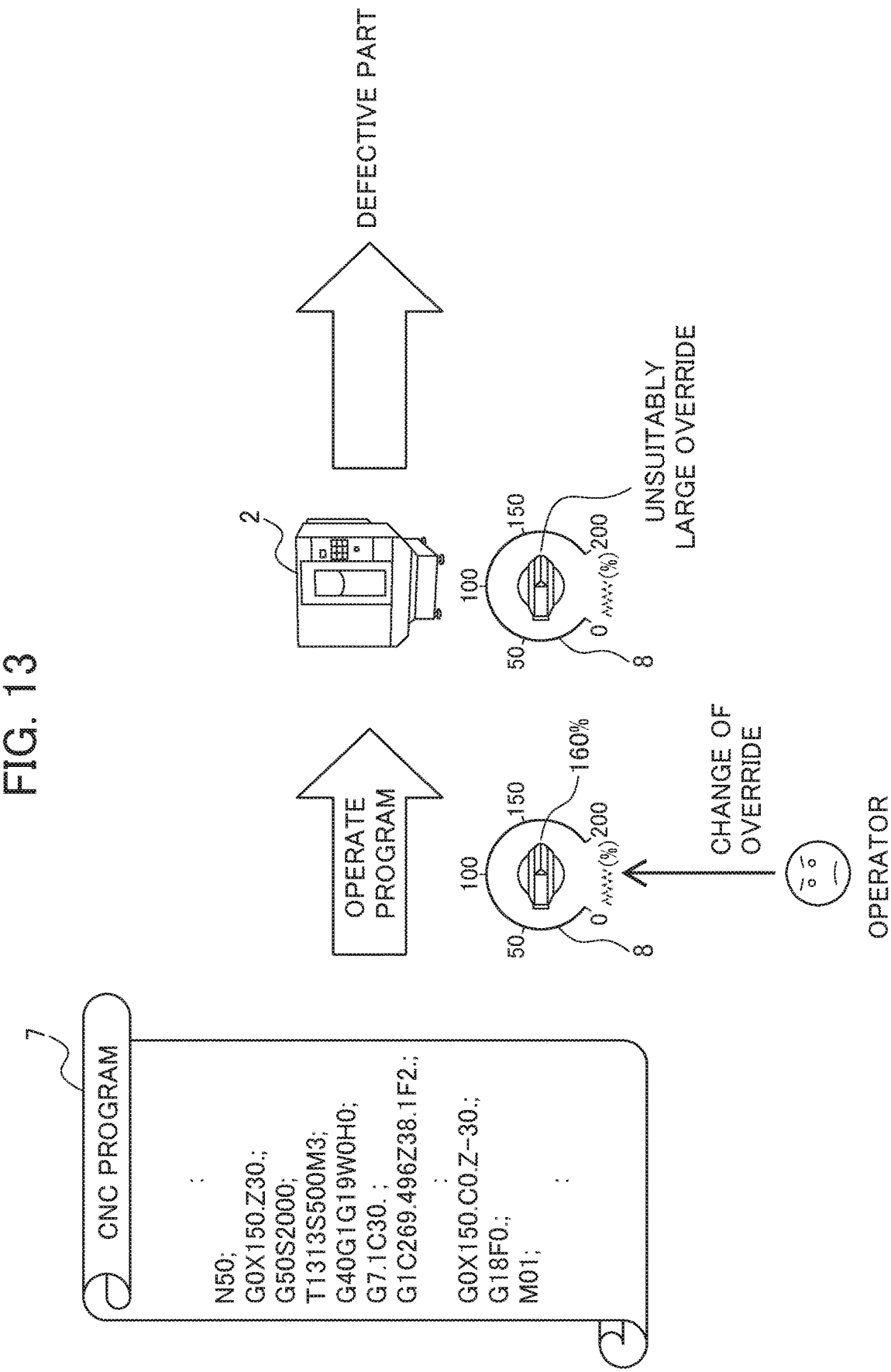
FIG. 13 is a diagram showing a conventional numerical control system of a machine tool.

In a case where in the numerical control system A of the machine tool in the present embodiment, the override function unit restricts the override, for example, as shown in FIG. 12 (see FIGS. 10 and 11), when the override specification operation unit 8 such as the dial on the operation panel is operated by the operator or the like, and the parameter rewriting command for the override restriction range setting is output, the override value determination unit 10 acquires, from the PMC 13, an override value OV specified with the override specification operation unit 8 by the operator or the like (step 1).

When the parameter rewriting command for the override restriction range setting is output, the CNC parameter rewriting unit 19 sets a lower limit value min3 to a lower limit value parameter (cccc) for the override restriction, sets an upper limit value max3 to an upper limit value parameter (dddd), rewrites the parameter (cccc) in the storage unit 5 to the lower limit value min3 and rewrites the parameter (dddd) to the upper limit value max3. Then, the override value determination unit 10 acquires the lower limit value min3 and the upper limit value max3 from the storage unit 5 (step 2).

Then, the override value determination unit 10 checks whether or not OV<lower limit value min3 is satisfied (step 3).

When OV<lower limit value min3 is satisfied, the override value determination unit 10 makes a setting such that OV=lower limit value min3 (step 4), and based on this override restriction range determined in the override value determination unit 10, the CNC automatic operation execution unit 11 starts the automatic operation of the machine tool 2 (step 7).

Furthermore, when OV<lower limit value min3 is not satisfied, the override value determination unit 10 checks whether or not OV>upper limit value max3 is satisfied (step 5), and when OV>upper limit value max3 is satisfied, the override value determination unit 10 makes a setting such that OV=upper limit value max3 (step 6), and based on this override restriction range determined in the override value determination unit 10, the CNC automatic operation execution unit 11 starts the automatic operation of the machine tool 2 (step 7).

Here, when OV<lower limit value min3 is not satisfied in step 3 and OV>upper limit value max3 is not satisfied in step 5, the automatic operation is started with the override value OV operated and commanded by the operator or the like without being changed (step 7).

Hence, in the override function unit 6 of the numerical control system A of the machine tool (industrial machine) in the present embodiment, the override change range setting is provided in the parameters (cccc and dddd) indicated in the CNC program 7, by the command for rewriting the parameters (cccc and dddd), the restriction is placed on the ranges of changes of overrides and the override restriction command program 7a which sets various types of overrides suitable for "each CNC program" or "each of the individual steps within the CNC program" is added to the machining program 7 of the CNC.

In this way, it is possible to restrict changes in the overrides for "each CNC program" or "each of the individual steps within the CNC program", in other words, it is possible to suitably apply overrides for "each CNC program" or "each of the individual steps within the CNC program", with the result that it is possible to reliably prevent a decrease in the quality of a machined surface and the occurrence of a defective part caused only by the fact that the operator desires to change overrides.

Although the first to third embodiments of the numerical control system of the industrial machine are described above, the present invention is not limited to the first to third embodiments described above, and modifications can be made as necessary without departing from the spirit thereof.

EXPLANATION OF REFERENCE NUMERALS

1 CNC (command unit)
2 machine tool
3 drive unit
4 control unit
5 storage unit
6 override function unit
7 CNC program (machining program)
7a override restriction command program
8 override specification operation unit
9 override range specification mode switching unit
10 override value determination unit
11 CNC automatic operation execution unit (automatic operation execution unit)
12 override range setting unit 15 macro program
16 PMC program
17 macro program processing unit
18 PMC processing unit
19 CNC parameter rewriting unit (parameter rewriting unit)
A numerical control system of a machine tool (industrial machine)

What is claimed is:

1. A numerical control system of an industrial machine which includes an override function unit that overrides a drive unit of the industrial machine,
wherein the override function unit includes:
an override specification operation unit for specifying an override;
an override restriction command program which is incorporated in a program of a numerical controller either according to an operation of the override specification operation unit or previously;
an override value determination unit which determines an override value based on the override restriction command program; and
an automatic operation execution unit for automatically operating the industrial machine based on an override restriction range determined in the override value determination unit.

2. The numerical control system of the industrial machine according to claim 1, wherein an override restriction command which makes the override restriction command program function is a G-code command that is a control command of the numerical controller.

3. The numerical control system of the industrial machine according to claim 1, wherein an override restriction command which makes the override restriction command program function is an M-code command that is a control command of the numerical controller.

4. The numerical control system of the industrial machine according to claim 1, wherein an override restriction command which makes the override restriction command program function is an override value change range setting parameter rewriting command in the program.

* * * * *